May 1, 1934.    J. H. BANINGER    1,957,057
ANTIFRICTION MOUNTING FOR LATHE CENTERS
Filed June 28, 1929
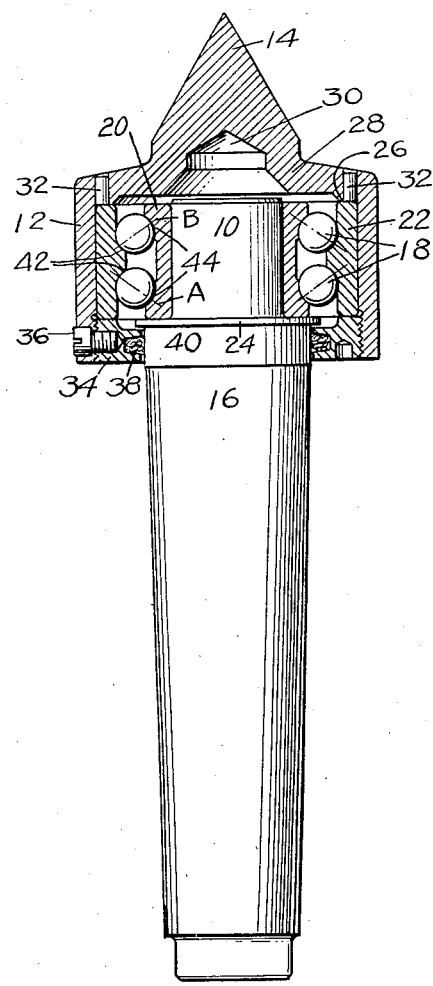
INVENTOR:
JOHN H. BANINGER
BY Giles P. Moore
HIS ATTORNEY Patented May 1, 1934

1,957,057

UNITED STATES PATENT OFFICE 1,957,057

ANTIFRICTION MOUNTING FOR LATHE CENTERS

John H. Baninger, Bristol, Conn., assignor, by mesne assignments, to General Motors Corporation, Detroit, Mich., a corporation of Delaware Application June 28, 1929, Serial No. 374,582

12 Claims. (Cl. 82—33)

This invention relates to antifriction mountings for lathe centers and comprises all the features of novelty herein disclosed.

New high speed tools, such as those made from tungsten carbide, make possible greatly increased cutting speeds for lathes such that dead centers are no longer practicable. Although these tools have very long life and great cutting speed, any appreciable play or chatter is apt to cause them to break and to produce other undesirable results. Accordingly, taper centers should be rotatably mounted to run with little friction while having accurate and firm support even at high speed. An object of the invention is to provide an antifriction mounting for lathe centers which will have the above mentioned and other advantages. Another object is to provide a lathe center mounting of the utmost simplicity and compactness and one which will nevertheless provide for smooth, high speed rotation with accurate and firm support.

To these ends and to improve generally and in detail upon devices of this character, the invention further consists in the various matters hereinafter described and claimed.

In its broader aspects the invention is not necessarily limited to the specific construction selected for illustration in the accompanying drawing in which The figure is a longitudinal central section.

A stud or projection 10 extends into a housing 12, one of these members, preferably the housing, having a tapered lathe center 14 projecting therefrom and the other member having a projecting shank 16 for supporting it on a tail or head stock. An antifriction bearing having two rows of rolling elements 18, herein shown as balls, is mounted between the stud and housing, the inner race ring 20 preferably having a push fit on the stud and the outer race ring 22 preferably having a drive fit in the housing. The inner race ring abuts against a collar or flange 24 on the shank and covers substantially the entire length of the stud. The outer race ring abuts against an annular face 26 on an end wall 28 of the housing and extends nearly to the open end of the housing. The taper center 14 has an internal recess 30 capable of retaining lubricant and the end wall 28 has one or more openings with removable pins or plugs 32 to provide for driving the outer race ring from the housing.

The housing is closed by a ring nut 34 threaded therein and fastened in abutting relation to the outer race ring by a screw 36. The nut has an extension with a felt channel 38 closely surrounding a smooth face 40 on the shank, the extension of the nut having a close running clearance with the outer face of the collar or flange 24. The running clearance is maintained by end thrust load on the taper center but the extension of the nut insures the retention of the housing on the stud when the load is removed. The antifriction bearing is shown as a double row ball bearing wherein the angular contact load lines A and B diverge towards the axis of rotation of the lathe center. The rolling elements are put under an initial predetermined compression or internal load in the directions of these load lines when the bearing is assembled so that, when external axial load is applied to the taper center 14, the load along the line B is not entirely removed. Consequently the rolling elements are always in contact with the angular contact raceways 42 on the one-piece outer race ring and with the opposing raceways 44 on the one-piece inner race ring, thus preventing play or chatter of the lathe center. The divergence of the load lines toward the axis of rotation, the preloading, and the one-piece construction of the race rings give great stability and accuracy of support. The stud and housing can be comparatively short, thus promoting simplicity and compactness and reducing the overall length.

I claim:

1. In a lathe-center or the like, relatively rotatable members one of which carries a work-supporting center, and rolling elements between said members and in such crowded engagement with their co-operating races when free from extraneous load that expansion of the bearing material will cause said rolling elements to still engage said races when subjected to normal working load; substantially as described.

2. In a lathe-center or the like, relatively rotatable members one of which carries a work-supporting center, and two rows of oppositely-facing angular-contact rolling elements between said members and in such crowded engagement with their co-operating races when free from extraneous load that expansion of the bearing material will cause said rolling elements to still engage said races when subjected to normal working load; substantially as described.

3. In a lathe-center or the like, relatively rotatable members one of which carries a work-supporting center, and a double-row rolling-bearing between said members and having both its cup member and its cone member unitary and provided with two oppositely-facing angular-contact races in which are rolling-elements so crowded upon the races when free from entraneous load that they will still engage said races when subjected to normal working load; substantially as described.

4. In a lathe-center or the like, a support, a rotatable housing about the same and carrying a work-engaging center, and a double-row rolling-bearing between said members and having its cone member unitary and provided with two races which face generally toward each other, and its cup member unitary and provided with two races between said cone races and facing generally away from each other, the rolling-elements co-operating with said races being so crowded upon them when free from extraneous load that they will still engage said races when subjected to normal working load; substantially as described.

5. In a lathe-center or the like, the combination with a shank adapted to be received in a lathe stock, an abutment at the end of said shank, a support projecting from said shank-end and beyond said abutment, and a rotatable housing about said support and carrying an end portion adjacent the end of said support and provided with a work-supporting center, of a double row ball-bearing which is between said support and housing and against said abutment and has both of its race-members unitary and provided with two ball-receiving races, said support and housing having a length of approximately only that of the said unitary race-members, and the balls of said bearing having such crowded engagement with said race-members when the bearing is free from extraneous load that they will still engage their race-members when the bearing is subjected to its normal working load; substantially as described.

6. In a lathe-center or the like, a shank adapted to be received in a lathe stock and having a circumferential projection at one end, an abutment at said end, a support projecting from said shank-end and beyond said abutment, a rotatable housing about said support and having a forward end portion adjacent the end of said support and provided with a work-supporting center, a unitary cone member of a double-row ball bearing slidably carried upon said support in engagement with said abutment and having two ball races which face generally toward each other, a co-operating unitary cup member of said bearing carried by said housing and having two ball races between the races of said cone member and facing generally away from each other, a row of balls in each set of co-operating said races and having such crowded engagement therewith when the bearing is free from extraneous load that they will still engage their race-members when the bearing is subjected to its normal working load, and a closure-member upon said casing and closing its rear end and overlapping the rear side of said circumferential projection, said support and housing having a length of approximately only that of the said unitary race-members of said ball-bearing; substantially as described.

7. In a lathe-center or the like, relatively-rotatable supporting and work-center parts each of which is provided with a unitary race-member that has two oppositely-facing angular races of which those of the outer said race-member lie between those of the inner said race-member, and rolling-elements between the respective sets of said races and of greater normal diameter than the distance between cooperating said races, whereby the two races of a given said race-member are immovable with respect to each other, the respective sets of said rolling-elements bear in lines that diverge toward the center of the device, and said rolling-elements are under load when free from load extraneous to the said race-members; substantially as described.

8. In a lathe-center or the like, relatively-rotatable supporting and work-center parts each of which is provided with a unitary race-member that has two races, and rolling-elements between the respective sets of said races and of greater normal diameter than the distance between co-operating said races, whereby the two races of a given said race-member are immovable with respect to each other, and said rolling-elements are under load when free from load extraneous to the said race-members; substantially as described.

9. In a lathe-center or the like, a support, a housing about said support and provided with a work-holder and having rotatable bearing upon said support, a closure-member upon said housing at its end removed from said work-holder, and a projection about said support and overlapping said closure-member upon its side toward said work-holder; substantially as described.

10. A lathe-center or the like comprising a stud, a housing about the same, a supporting-shank extending from one of said parts and a work-support upon the other thereof, and a double-row bearing between said stud and housing and having each of its race-members unitary and provided with two races of which the intermediate race-portions are immediately adjacent each other, the forward end of said supporting-shank being adjacent one end of one of said race-members, and the rear end of said work-support being adjacent the opposite end of the other of said race-members, whereby the structure is stiffened, a short bearing is provided, and the said shank and work-support are brought close to the bearing; substantially as described.

11. A lathe-center or the like comprising a supporting-shank having an abutment and a stud projecting beyond the same, a housing about said stud and provided with a work-support, and a double-row bearing between said stud and housing and providing for angular contact in lines that approach each other as they proceed from said stud, said bearing having each of its race-members unitary and provided with two races of which the intermediate race-portions are immediately adjacent each other, said shank-abutment being adjacent the rear end of said cone race-member, and the forward end of said housing being adjacent the forward end of said cup race-member; substantially as described.

12. In a lathe-center or the like, the combination with relatively rotatable members one of which carries a work-supporting center, said members having abutments, of two rows of bearing-elements between said relatively rotatable members, and inner and outer race-members for said bearing-elements and between said abutments, said race-members having intermediate race-portions immediately adjacent each other, one end of an outer race-portion immediately adjacent one of said abutments, and the opposite end of an inner race-portion immediately adjacent the other said abutment, said bearing-elements being in such crowded engagement with their said cooperating races when free from working load that expansion of the bearing material will cause said rolling elements to still engage said races when subjected to normal working load; substantially as described.

JOHN H. BANINGER.